United States Patent [19]

Acharya et al.

[11] Patent Number: 4,606,196
[45] Date of Patent: Aug. 19, 1986

[54] VACUUM INSULATION SYSTEM

[75] Inventors: Arun Acharya, East Amherst; Michael F. Patterson, Clarence Center; Jeffert J. Nowobilski, Orchard Park, all of N.Y.

[73] Assignee: Union Carbide Corporation, Danbury, Conn.

[21] Appl. No.: 683,572

[22] Filed: Dec. 19, 1984

[51] Int. Cl.⁴ .............................................. F17C 1/00
[52] U.S. Cl. .......................................... 62/45; 62/48; 220/421; 220/429
[58] Field of Search ............... 62/45, 55, 48; 220/420, 220/421, 429, 454

[56] References Cited

U.S. PATENT DOCUMENTS

| | | | |
|---|---|---|---|
| 2,900,800 | 8/1959 | Loveday | 62/45 |
| 3,108,706 | 10/1963 | Matsch et al. | 220/9 |
| 3,118,194 | 1/1964 | Biais | 62/45 |
| 3,130,561 | 4/1964 | Hnilicka, Jr. | 62/45 |
| 3,416,325 | 12/1968 | Nelson | 62/45 |
| 3,461,678 | 8/1969 | Klipping et al. | 62/45 |
| 4,000,246 | 12/1976 | Walles | 423/230 |
| 4,061,724 | 12/1977 | Grose et al. | 423/335 |
| 4,154,363 | 5/1979 | Barthel | 220/421 |
| 4,215,798 | 8/1980 | Patterson et al. | 220/421 |
| 4,401,556 | 8/1983 | Bezman et al. | 208/111 |

Primary Examiner—Ronald C. Capossela
Attorney, Agent, or Firm—Stanley Ktorides

[57] ABSTRACT

An insulation system, and method of fabricating insulating means, comprising insulating material having good heat transfer resistance at pressures between 1 and 500 microns of mercury, and hydrophobic molecular sieve adsorbent having a water capacity of less than 12 percent.

19 Claims, 2 Drawing Figures

VACUUM INSULATION SYSTEM

TECHNICAL FIELD

This invention relates to insulation which can be used to maintain a cryogenic temperature and to the fabrication of double-walled insulating means which employ such insulation.

BACKGROUND ART

High quality insulation systems are often used to prevent heat leak into production, distribution or storage facilities for material and equipment intended to be kept at low temperatures. This is particularly the case where the low temperatures required are cryogenic temperatures, i.e., below 240° K. Such insulation systems frequently employ double-walled means with the volume or space between the walls evacuated to relatively low vacuum. This is advantageous because by reducing the number of gas molecules in the space, the frequency of intermolecular collisions, or equivalently, the amount of heat transferred by gas conduction, is reduced. Often the evacuated space also contains solid insulation such as glass fibers, perlite or superinsulation to further retard heat transfer.

The gases to be evacuated from the space are from several sources including gas present during assembly of the double-walled insulating means, offgassing from materials exposed to the vacuum and leakage or permeation into the evacuated space after the space is sealed. Typically the desired vacuum is produced by a combination of external vacuum pumping and an adsorbent within the evacuated space. External vacuum pumping removes much of the gas present during assembly while adsorbent removes gases from offgassing, permeation and leakage thus achieving and maintaining a low vacuum for effective heat transfer resistance.

Adsorbents are normally effective in removing from the evacuated space gases such as hydrocarbons and atmosphere gases such as oxygen, nitrogen, and water vapor. However, a problem with adsorbents is that their affinity for water plays havoc with their effectiveness in adsorbing other gases. Water is very strongly held by the commonly used adsorbents such as zeolite molecular sieve or activated carbons. For example, zeolite 5A, a conventional molecular sieve adsorbent, has a water capacity of about 21 percent by weight, at which point it has essentially no capacity for oxygen and nitrogen. Activated carbon is not as hydrophilic as molecular sieve at low humidity, but it will become saturated on exposure to higher humidity. Carbon holds water rightly and loses half its capacity for air at about 20 percent water loading. Essentially all air capacity is lost at about 40 percent water loading. Also, carbon has the major disadvantage of combustibility; it is not safe for use in insulation systems having potential for high concentration of oxygen, e.g., a liquid oxygen storage tank.

Several approaches have been taken to solve this water problem. The most straightforward approach is to simply use enough adsorbent so that it is not all saturated by water. In most cases, the amount required is so large as to be impractical.

A second method is to prevent water from entering the system. For example, the adsorbent can be stored in a sealed container prior to use. However keeping the insulation dry is generally quite complicated. There is generally a certain amount of water structurally associated with the insulation, and, due to its large surface area, insulation adsorbs a significant amount of water from the ambient air. The exact amount of adsorbed water depends on the relative humidity of the air, but powder or glass fiber insulation typically may contain from 0.5 to 1.0 percent weight of water, and other fibers, such as rayon, may contain up to 6 percent of adsorbed and/or dissolved water. Protecting the typically large amount of insulation from exposure to humidity is cumbersome and adds to the cost of manufacturing the system.

A third means for reducing water content in an insulation system is simultaneous heating and evacuation of the system. This costly method cannot completely remove water from the insulation, since all the water does not diffuse to the point of evacuation at a fast enough rate, e.g., within several days. Furthermore heating may destroy some of the materials used in constructing the system. Also large containers, such as the outer vessel of a liquid storage tank, are very difficult and often impractical to heat.

Usually, a combination of these three methods is used as shown for example in U.S. Pat. No. 4,154,363—Barthel. Barthel uses activated carbon in combination with multilayer insulation composed of hydrophobic fibers and metallic foil. The insulation space undergoes a short evacuation period. Since the fibers are hydrophobic, they evolve only a small amount of water, all of which can be adsorbed by the quantity of adsorbent present. Barthel demonstrates one way to prevent saturation of the adsorbent with water, but the multilayer insulation used is expensive and complex to manufacture. It would be desirable to use a conventional insulation that is simple and low in cost.

It is therefore an object of this invention to provide an improved insulation system.

It is another object of this invention to provide an improved insulation system for use at vacuum conditions wherein water does not detrimentally affect the ability of adsorbent to attain and maintain vacuum conditions.

It is a further object of this invention to provide a method to fabricate double-walled insulating means without need for a water removal step.

SUMMARY OF INVENTION

The above and other objects which will become apparent to one skilled in the art upon a reading of this disclosure are attained by the present invention one aspect of which comprises:

An insulation system for maintaining material at a cryogenic temperature comprising:
  (a) insulating material having essentially consistent heat transfer characteristics over the pressure range of from 1 to 500 microns of mercury; and
  (b) hydrophobic molecular sieve adsorbent having a water capacity of less than 12 percent.

Another aspect of the present invention comprises:
A method for fabricating insulating double-walled means for maintaining material at a cryogenic temperature, without need for a water removal step, comprising:
  (1) providing a first wall member;
  (2) providing a second wall member spaced from the first wall member to define an insulating volume between the wall members;
  (3) providing to the insulating volume an insulation system comprising insulating material having essentially consistent heat transfer characteristics over the pressure range of from 1 to 500 microns of mercury, and hydrophobic molecular sieve adsorbent having a water capacity of less than 12 percent;

(4) sealing the insulating volume; and (5) evacuating the insulating volume to a pressure in the range of from 1 to 500 microns of mercury.

As used herein, the term "water capacity" means the equilibrium water loading measured in saturated air at room temperature of 25° C.

As used herein, the term "cold wall" means the wall member which is proximate the cold entity to be insulated.

As used herein, the term "consistent heat transfer characteristics" means heat transfer characteristics which change less than one order of magnitude.

BRIEF DESCRIPTION OF THE DRAWINGS

FIG. 2 also contains for comparative purposes a graphical representation of nitrogen capacity for a commonly used adsorbent.

DETAILED DESCRIPTION

The invention will be described in detail with reference to the drawings.

Figure 1:
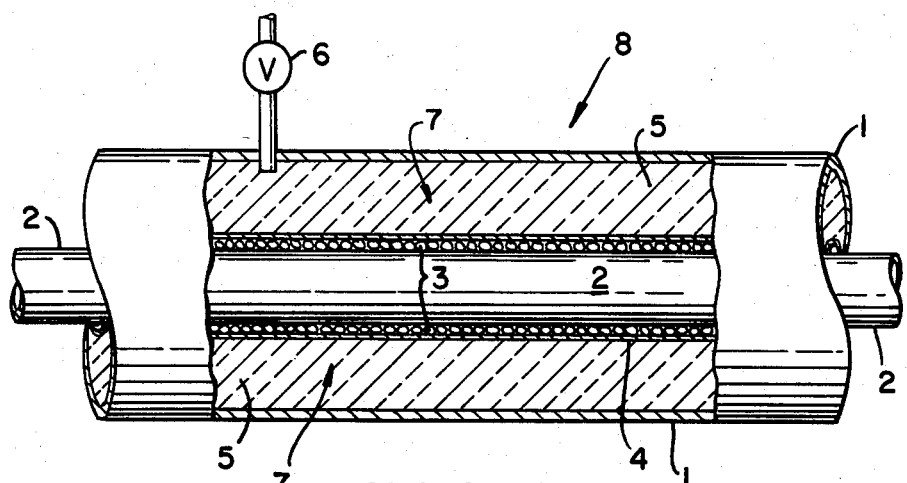
FIG. 1 is a cross-sectional representation of one embodiment of the invention wherein the double-walled insulating means is a conduit.

Referring to FIG. 1, double walled insulating means 8 comprises first wall member 2 which is an inner conduit through which may flow a cryogenic fluid such as liquid oxygen. Second wall member 1, which in this case is another conduit, is spaced from the first wall member 2 to define an insulating volume 7 between the wall members. Other examples of double-walled insulating means include double-walled vessels for storage of solids or liquids and double-walled panels which may be fabricated into an enclosure for apparatus or material intended to operate or remain at low temperature, such as machinery to handle cryogenic fluids.

Second wall member 1 may contain means such as valve 6 which may be used to evacuate space 7 of gases which are present at the time of fabrication.

Within insulating volume 7 there is provided insulation material 5 and hydrophobic molecular sieve adsorbent 3.

Insulating material 5 is characterized by having esentially consistent heat transfer characteristics over the pressure range of from 1 to 500 microns of mercury. This is in contrast to superinsulation which varies from $3.2 \times 10^{-4}$ to $3.2 \times 10^{-2}$ BTU/hr-ft-°R over the pressure range of from 1 to 500 microns of mercury. Thermal conductivity may be measured using ASTM C518-76 and C177-76. Preferably the thermal conductivity of the insulation useful in this invention is less than about $5 \times 10^{-2}$ BTU/hr-ft-°R. Thermal conductivity greater than this may require an impractical insulation thickness.

The insulation may be powdered, granular or fibrous in nature. Examples of insulation suitable for use in this invention include fiberglass, processed diatomaceous earth, perlite and foam such as phenolic or open-celled foam. Thus one may effectively employ relatively low cost insulation without suffering a loss of insulating ability. Furthermore, the insulation of this invention may have a relatively high water content when provided to the insulating volume such as greater than 0.10 percent by weight and even greater than 1.0 percent by weight. The insulation may be employed in the insulating volume in any effective density. Preferably density of the insulation employed is from 1 to 50 pounds per cubic foot (pcf), most preferably from about 4 to 10 pcf. Typically the thermal conductivity of the insulation is on the order of $10^{-3}$ or $10^{-4}$ BTU/hr-ft-°R.

Hydrophobic molecular sieve adsorbent 3 is characterized by having a water capacity of less than 12 percent, preferably less than 5 percent. Preferably the hydrophobic molecular sieve will have good air capacity such as greater than 10 cc(STP)/gm at the operating pressure. Examples of such molecular sieve adsorbent include crystalline siliceous LZ-10, LZ-20 and silicalite S-115 which are all commercially available from Union Carbide Corporation. These hydrophobic molecular sieve adsorbents are described in U.S. Pat. No. 4,061,724, Grose et al and U.S. Pat. No. 4,401,556, Bezman et al. Both of these patents are incorporated herein by reference. The preferred molecular sieve adsorbent is silicalite S-115.

Preferably the molecular sieve adsorbent is positioned within the insulating volume proximate or in thermal contact with the cold wall of the double-walled insulating means. FIG. 1 illustrates one preferred arrangement wherein the adsorbent 3 is attached to first wall member 2 by adhesive means 4, which in this case is foil tape.

The amount of defined molecular sieve adsorbent which is necessary is uniformly less than the amount of adsorbent necessary in heretofore known systems. The amount of defined adsorbent may be from 1 to 100 grams per cubic foot of insulating volume ($3.5 \times 10^{-5}$ to $3.5$ to $10^{-3}$ grams/cubic centimeter). The exact amount depends on the expected gas intrusion from permeation and leakage. For example, in a vacuum insulated conduit with metal walls and with one leak ($10^{-5}$ cc/sec at standard conditions of temperature and pressure, STP) per linear foot allowed, about 10 g/ft$^3$ of hydrophobic sieve may be used.

The first and second wall members are relatively impermeable and may be constructed of metal, such as stainless steel for long service life. For short service life, the wall members may be a plastic or plastic laminate. It is an important benefit of this invention that impermeable wall members are not strictly required as have heretofore been necessary. Relatively permeable materials such as polymers or metallized plastic laminates have nitrogen and oxygen permeability of less than $1.0 \times 10^{-10}$ cc(STP) mm/cm$^2$ cmHg sec, and water permeability may be as great as $100 \times 10^{-10}$ cc(STP) mm/cm$^2$ cmHg sec. However, because water does not significantly reduce the defined hydrophobic sieve's capacity for atmospheric gases, this water permeability is tolerable. Relatively permeable materials generally have much lower thermal conductivity than substantially impermeable materials and may be lower in cost. Of course, the material used must possess the required structural properties for the particular application. For example, the inner pipe in a vacuum insulated conduit intended to carry a cryogenic liquid may be made of stainless steel. If permeable materials are used for long service, even the modest permeation rates would eventually cause degradation of the insulating capability of the system. The material selection is based on the permeability of the material, sieve capacity and expected service life, and is within the capability of one skilled in the art.

The fabrication of the doubled-walled insulating means of this invention is much less complicated and consequently less expensive than fabrication methods for heretofore available double-walled insulators. Prior to fabrication both the insulation and the molecular sieve adsorbent may be exposed to ambient air without detriment. No water removal step, such as heating, is necessary. The external evacuation required by the present invention is much less than that required by previous methods. For example, the insulating volume need be externally evacuated to only less than 1000 microns of mercury. Evacuation to the range of 1 to 500 microns of mercury can be carried out by the adsorbent. In some applications, such as those with a relatively small insulating volume, the adsorbent alone may evacuate the insulating volume to the final working pressure. In previous practice such procedure was impossible because water loading would reduce adsorbent capacity. In previous practice external evacuation is required to reduce pressure in the insulating volume to the order of 10 microns of mercury or less in order for the adsorbent to effectively maintain the vacuum.

It is another important advantage of this invention that greater leak rates into the insulating space are allowable. Previously, stringent manufacturing techniques to prevent leaks greater than $10^{-7}$ cc/sec were required, since the adsorbent had to take up both water and other gases. To check for such small leaks, expensive equipment, such as a helium leak detector, is used. In the present invention, leaks as large as $10^{-3}$ cc/sec are allowable, since water will not use up the hydrophobic adsorbent's capacity for other gases. Leak detection to this rate is much easier; a simple soap bubble test may be used. Of course, the longer is the expected service life, the smaller is the allowable leak rate for a given amount of sieve. The allowable leak rate can be calculated by one skilled in the art from the sieve capacity, the insulating volume and the service life; it is always larger than the leak rate tolerable with previously known systems.

As is known to those skilled in the art, generally the greater the degree of vacuum at which an insulation system operates, the less is the heat transfer through the insulation system. Accordingly, the insulation system of this invention is preferably operated at from 1 to 150 microns of mercury, although satisfactory operation is attainable at a vacuum up to 500 microns of mercury.

Figure 2:
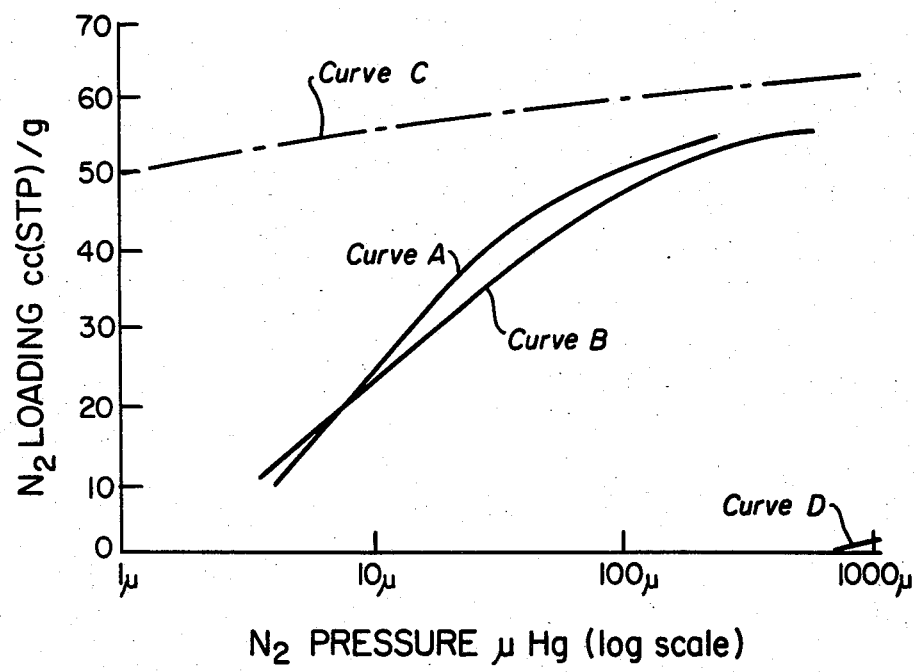
FIG. 2 is a graphical representation of the capacity at 90° K. of the hydrophobic sieve useful in the present invention for nitrogen at various pressures.

The nitrogen capacity of molecular sieve adsorbent useful in this invention was tested experimentally and the results are shown graphically in FIG. 2. Silicalite S-115 in equilibrium with ambient conditions of 23° C. and 60 percent relative humidity was placed in a glass vessel and vacuum pumped for one hour without heating to a pressure of 220 microns of mercury. When the vessel was cooled to 90° K., the pressure in the vessel became less than 10 microns of mercury. Nitrogen was introduced into the vessel until the pressure reached 10 microns Hg; the sieve had adsorbed about 25 cc(STP)/gram of sieve. More nitrogen was metered to the vessel until the pressure reached 100 microns Hg; sieve capacity at this pressure was about 50 cc(STP)/g. These results are shown graphically in FIG. 2 as curve A. A second sample of S-115 exposed to the same ambient conditions was vacuum pumped for 15 days, without heating, to 0.3 microns of mercury, and the same procedure was followed. The capacity of the second sample was virtually the same, within experimental error, as the first sample and is shown as Curve B in FIG. 2. These results indicate that the adsorbent has good capacity, even after prolonged exposure to humidity. The results with the second sample show that rigorous processing conditions are not required to achieve this good capacity.

FIG. 2 also shows the capacity of a commonly used molecular sieve adsorbent, zeolite 5A. The procedures described above were repeated for 5A and the results are shown as Curves C and D. When 5A is kept relatively dry, such as at 5 percent preloaded water, its capacity, as shown by Curve C is greater than that of S-115, but when 5A holds only 10 percent preloaded water, Curve D, it is virtually useless as a vacuum-maintaining adsorbent.

The curves of FIG. 2 serve to highlight the unobviousness of the present invention. The defined hydrophobic molecular sieve useful in this invention has a lower capacity for air than either dry zeolite 5A or carbon. Furthermore, its capacity decreases rapidly at extremely low pressure. Thus the defined hydrophobic molecular sieve would not generally be considered for use as a vacuum-maintaining adsorbent. However such hydrophobic molecular sieve has much greater capacity for air than the conventionally used adsorbents at pressures between 1 and 500 microns of mercury when significant amounts of water are present. Insulation having the characteristic of higher tolerance to pressures in this range is generally also characterized by having a relatively large amount of water and thus not suitable for use in a high quality insulation system. Thus two entities, insulation and adsorbent, which individually would offer little, if any, reason to be employed in a high quality insulation system, when combined, result in a remarkably efficient, high-quality insulation system. The combination of this invention allows manufacturing techniques which are less complicated and costly than previous techniques because water need not be removed from the system and a higher gas leak rate can be tolerated. Furthermore, such costly insulation as multilayer superinsulation, which requires a vacuum of less than 1 micron of mercury to be effective, is not required, yet comparable heat transfer resistance as can be achieved with such superinsulation can be attained at much less total cost with the insulation system of this invention, although a greater insulation thickness is required.

The insulation system of this invention is particularly useful for maintaining a temperature below 240° K. This is because at such a temperature, water which may be within the insulating volume, freezes and has low vapor pressure, and thus does not significantly contribute to heat transfer.

We claim:

1. An insulation system for maintaining material at a cryogenic temperature comprising an insulating volume, evacuated to a pressure less than 1000 microns of mercury, containing:
   (a) insulating material having heat transfer characteristics which change less than one order of magnitude over the pressure range of from 1 to 500 microns of mercury; and
   (b) hydrophobic molecular sieve adsorbent having a water capacity of less than 12 percent.

2. The insulation system of claim 1 wherein said adsorbent is silicalite S-115.

3. The insulation system of claim 1 wherein said adsorbent is LZ-10.

4. The insulation system of claim 1 wherein said adsorbent is LZ-20.

5. The insulation system of claim 1 wherein said insulating material is fiberglass.

6. The insulation system of claim 1 wherein said insulating material is perlite.

7. The insulation system of claim 1 wherein said insulating material is open-celled foam.

8. The insulation system of claim 1 wherein said insulating material is processed diatomaceous earth.

9. The insulation system of claim 1 wherein the insulating volume is evacuated to a pressure in the range of from 1 to 500 microns of mercury.

10. The insulation system of claim 1 wherein said insulating material has a water content greater than 0.10 percent.

11. The insulation system of claim 1 wherein the insulating volume is defined by first and second wall members.

12. The insulation system of claim 11 wherein the hydrophobic molecular sieve adsorbent is proximate to or in thermal contact with the wall member proximate the cold entity to be insulated.

13. The insulation system of claim 1 wherein the hydrophobic molecular sieve has a water capacity of less than 5 percent.

14. The insulation system of claim 1 wherein the hydrophobic molecular sieve is present within the insulating volume in an amount of from 1 to 100 grams per cubic foot of insulating volume.

15. The insulation system of claim 11 wherein the first and/or second wall member is constructed of metal.

16. The insulation system of claim 15 wherein said metal is stainless steel.

17. The insulation system of claim 11 wherein the first and/or second wall member is constructed of plastic.

18. The insulation system of claim 11 wherein the first and/or second wall member is constructed of plastic laminate.

19. The insulation system of claim 11 wherein the first and/or second wall member is constructed of material having a water permeability up to $100 \times 10^{-10}$ cc mm/cm$^2$ cmHg sec.

* * * * *

UNITED STATES PATENT AND TRADEMARK OFFICE
CERTIFICATE OF CORRECTION

PATENT NO. : 4,606,196

DATED : August 19, 1986

INVENTOR(S) : A. Acharya et al

It is certified that error appears in the above-identified patent and that said Letters Patent is hereby corrected as shown below:

In column 1, line 52 delete "rightly" and insert therefor --tightly--.

Signed and Sealed this

Fifteenth Day of September, 1987

Attest:

DONALD J. QUIGG

*Attesting Officer*  *Commissioner of Patents and Trademarks*